(12) United States Patent
Bakker

(10) Patent No.: US 11,132,811 B2
(45) Date of Patent: Sep. 28, 2021

(54) METHOD AND SYSTEM FOR IMPROVING SIZE SELECTION OF GARMENTS

(71) Applicant: INVISTA NORTH AMERICA S.A R.L., Wilmington, DE (US)

(72) Inventor: Willem Bakker, Divonne (FR)

(73) Assignee: THE LYCRA COMPANY LLC, Wilmington, DE (US)

( * ) Notice: Subject to any disclaimer, the term of this patent is extended or adjusted under 35 U.S.C. 154(b) by 107 days.

(21) Appl. No.: 16/078,326

(22) PCT Filed: Mar. 6, 2017

(86) PCT No.: PCT/US2017/020948
§ 371 (c)(1),
(2) Date: Aug. 21, 2018

(87) PCT Pub. No.: WO2017/155882
PCT Pub. Date: Sep. 14, 2017

(65) Prior Publication Data
US 2019/0057514 A1    Feb. 21, 2019

Related U.S. Application Data

(60) Provisional application No. 62/305,199, filed on Mar. 8, 2016.

(51) Int. Cl.
G06T 7/62       (2017.01)
G06Q 10/04      (2012.01)
G06Q 10/00      (2012.01)
A41B 11/14      (2006.01)

(52) U.S. Cl.
CPC ............... *G06T 7/62* (2017.01); *A41B 11/14* (2013.01); *G06Q 10/00* (2013.01); *G06Q 10/04* (2013.01); *G06T 2200/04* (2013.01); *G06T 2207/30196* (2013.01)

(58) Field of Classification Search
CPC ............ G06T 7/62; G06T 2200/04; G06T 2207/30196; A41B 11/14
See application file for complete search history.

(56) References Cited

U.S. PATENT DOCUMENTS

| 8,908,928 B1* | 12/2014 | Hansen | G06K 9/00369 |
| | | | 382/111 |
| 9,996,981 B1* | 6/2018 | Tran | G06K 9/4671 |
| 10,013,710 B2* | 7/2018 | Di | G06Q 30/0631 |
| 10,070,672 B2* | 9/2018 | Simoes | A41D 13/08 |
| 10,089,680 B2* | 10/2018 | Lin | G06Q 30/0643 |

(Continued)

FOREIGN PATENT DOCUMENTS

| JP | H1176208 | 3/1999 |
| JP | 2004232115 | 8/2004 |

(Continued)

OTHER PUBLICATIONS

International Search Report and Written Opinion received for PCT Application No. PCT/US2017/020948, dated May 11, 2017, 10 pages.

*Primary Examiner* — Santiago Garcia
(74) *Attorney, Agent, or Firm* — Bridget C. Sciamanna; Kathleen A. Tyrrell

(57) ABSTRACT

A method and system that facilitates the size selection for garments such as hosiery or pantyhose with the aim to improve comfort and fit for the wearer is provided.

10 Claims, 3 Drawing Sheets

(56) References Cited

U.S. PATENT DOCUMENTS

| | | | |
|---|---|---|---|
| 10,282,914 B1* | 5/2019 | Tran | A61B 5/1079 |
| 2002/0004763 A1* | 1/2002 | Lam | G06F 1/26 |
| | | | 705/26.44 |
| 2002/0178061 A1* | 11/2002 | Lam | G06Q 30/0272 |
| | | | 705/14.68 |
| 2004/0083142 A1* | 4/2004 | Kozzinn | G06Q 40/04 |
| | | | 705/26.5 |
| 2005/0022708 A1* | 2/2005 | Lee | G06Q 30/02 |
| | | | 112/186 |
| 2010/0111370 A1* | 5/2010 | Black | G06K 9/00369 |
| | | | 382/111 |
| 2011/0058725 A1* | 3/2011 | Markwardt | G06K 9/52 |
| | | | 382/132 |
| 2012/0156962 A1* | 6/2012 | Krawchuk | A41C 1/06 |
| | | | 450/92 |
| 2014/0176565 A1* | 6/2014 | Adeyoola | G06F 16/5854 |
| | | | 345/473 |
| 2016/0093085 A1* | 3/2016 | Ray | G06T 13/40 |
| | | | 345/419 |
| 2017/0036066 A1* | 2/2017 | Chahine | G06K 9/00342 |
| 2017/0061683 A1* | 3/2017 | Dorin | G06T 17/00 |
| 2017/0083971 A1* | 3/2017 | Ray | G06Q 30/0643 |
| 2018/0137640 A1* | 5/2018 | Farahbakhshian | G06T 5/009 |

FOREIGN PATENT DOCUMENTS

| | | |
|---|---|---|
| JP | 2011115434 | 6/2011 |
| KR | 20140140997 | 12/2014 |
| WO | 01/46911 A1 | 6/2001 |
| WO | 2017/155882 A1 | 9/2017 |

* cited by examiner

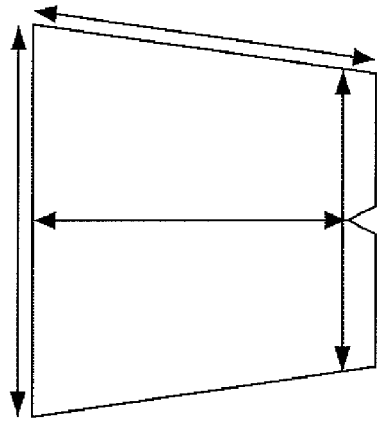
FIG. 2A
FIG. 2B
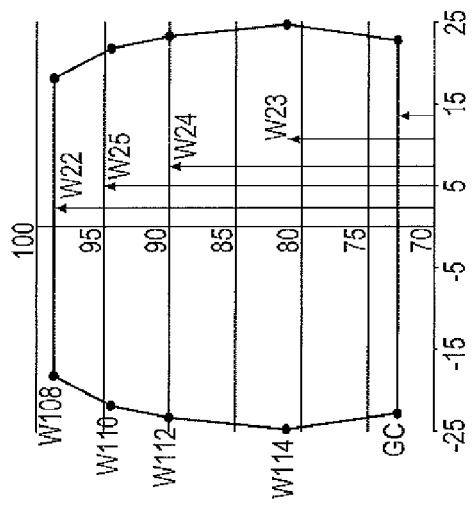
FIG. 1A contd.
(PRIOR ART)

METHOD AND SYSTEM FOR IMPROVING SIZE SELECTION OF GARMENTS

FIELD OF INVENTION

The present disclosure relates to a method and system that facilitates the size selection for garments. In one nonlimiting embodiment, the method and system is used to select more comfortable hosiery or pantyhose.

BACKGROUND

Currently, most size charts are based on the length and weight of the wearer. These metrics do not give a good prediction of the body shape. This can be best demonstrated by calculating the Body Mass Index (BMI) for each length/weight combination of the size chart (see FIG. 1) which shows that within a given size, low and high BMI's can be found. This means that the body shapes at the extremes of a given size can be quite different. From consumer research, it is known that proper size selection for garments with the right comfort and fit is a major issue for the consumer. When size charts use metrics that have little predictive value for the body size, this is quite understandable.

In the apparel market, the use of body scanners is fast growing. These scanners are becoming smaller and more cost effective, enabling placement in areas such as shopping malls to scan consumers and use the output of these scanners for garment selection. With the improvement of cameras in mobile technology such a smart phones and tablets, software and apps which convert camera pictures into body scans are becoming available. These technologies enable scanning of consumers in a shop, or even at home, to provide for improved size selection.

However, most of these developments are targeted at non-elastic garments and work by finding the best match between the body shape and the actual shape of the non-elastic garment.

For elastic garments, the situation is more complex, as a well designed elastic garment should be smaller than the body in order to provide the stretch and compression for proper fit.

SUMMARY OF THE INVENTION

An aspect of the present invention relates to a method of facilitating and/or improving satisfaction with size selection of a garment.

In one nonlimiting embodiment, the garment is an elastic garment.

In one nonlimiting embodiment, the garment is hosiery or pantyhose.

In one nonlimiting embodiment, the method uses a body scanner to define the area of the surface of key parts of the wearer of the garment. As a nonlimiting example, for hosiery or pantyhose such key parts are the area of surface of the panty of the wearer and the area of surface of both legs of the wearer. The method also defines the area of these surfaces for a relaxed garment and defines the stretch levels of the garments in these key parts as well as the limits for the minimum and/or maximum stretch level of a given size of a given garment. The method then provides a recommendation for selecting the optimal size on the basis of these metrics.

In one nonlimiting embodiment, the body scan is based upon a photograph taken of an interested purchaser and/or wearer of the garment with, for example, a mobile device such as a tablet or mobile telephone.

Another aspect of the present invention relates to a system of facilitating and/or improving satisfaction with size selection of a garment.

In one nonlimiting embodiment, the garment is an elastic garment.

In one nonlimiting embodiment, the garment is hosiery or pantyhose.

In one nonlimiting embodiment, the system comprises a body scanner to define the area of the surface of key parts of the wearer of the garment. As a nonlimiting example, for pantyhose such key parts are the area of surface of the panty of the wearer and the area of surface of both legs of the wearer. The system further comprises a computer program which defines the area of these surfaces for a relaxed garment, defines the stretch levels of the garments in these key parts as well as the limits for the minimum and/or maximum stretch level of a given size of a given garment and then provides a recommendation for selecting the optimal size on the basis of these metrics.

In one nonlimiting embodiment, the body scan is based upon a photograph taken of an interested purchaser and/or wearer of the garment with, for example, a mobile device such as a tablet or mobile telephone and entered into the computer program.

BRIEF DESCRIPTION OF THE FIGURES

FIGS. 2A and 2B are diagrams defining the panty area from body scan data (FIG. 2A) and defining the panty area of a relaxed garment (FIG. 2B).

DETAILED DESCRIPTION OF THE INVENTION

Figure 1A:
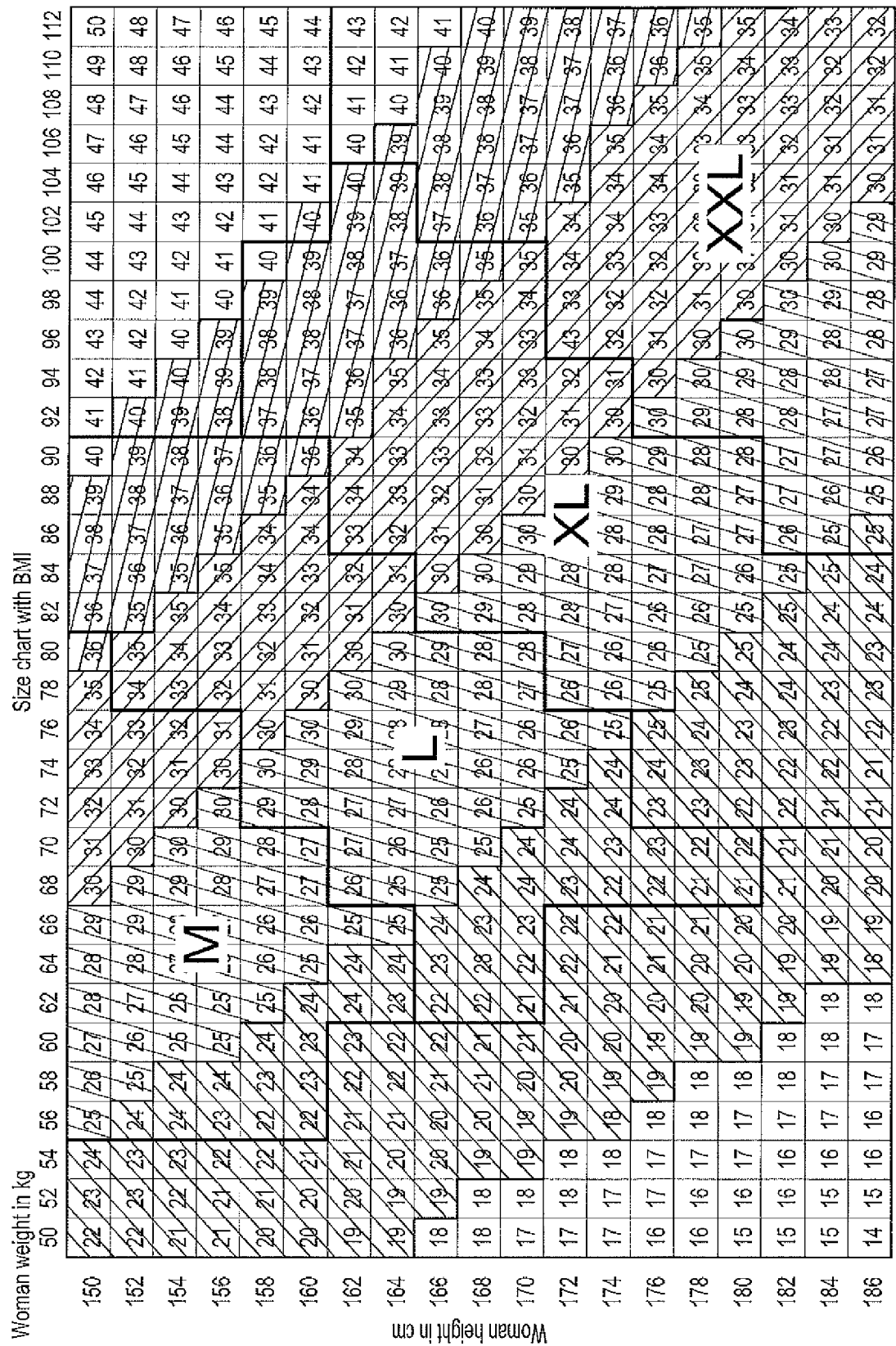
FIG. 1 is a size chart from the prior art based on weight and length with Body Mass Index regions.

Currently, in most countries size selection is based on a size chart based on the length and weight of the consumer such as set forth in FIG. 1, resulting in a high level of dissatisfaction of consumers for finding the right size. Provided by this disclosure are methods and systems for improving size selection of garments based upon one or more key metrics for comfort.

Methods and systems of this disclosure are based on obtaining data on meaningful body dimensions, preferably via mobile technology such as a cell phone or tablet, and using these data to recommend a size based upon one or more key metrics for comfort after processing data of the consumer's body dimension and the garment characteristics. In one nonlimiting embodiment, the garment is an elastic garment. In one nonlimiting embodiment, the garment is hosiery or pantyhose.

In simplest form, the method of the present disclosure comprises obtaining a body scan; using the body scan to determine selected body size dimensions; and identifying optimal garment size based upon the selected body size dimension and a metric for comfort.

In simplest form, the system of the present disclosure comprises a body scanner to define the area of the surface of key parts of a wearer of a garment and a computer program which determines comfort metrics based upon one or more of a defined area of surface for relaxed garments in these key parts, defined stretch levels of garments in these key parts, and defined limits for minimum and/or maximum stretch level of a given size of a given garment and provides a recommendation for selecting the optimal size on the basis of these comfort metrics.

The method and system are described in more detail below for the nonlimiting embodiment of sizing of pantyhose, a garment that exercises high stretch on the body. However, as will be understood by the skilled artisan upon reading this disclosure, the method and system comprising defining key metrics such as stretch level limits for comfort and proper fit by comparing certain body areas to the area of the relaxed garment can also be applied on other garments than pantyhose. In one nonlimiting embodiment, the method and system of this disclosure will provide a list of garments from collections of selected retailers for which optimal sizing is provided.

Figure 3A:
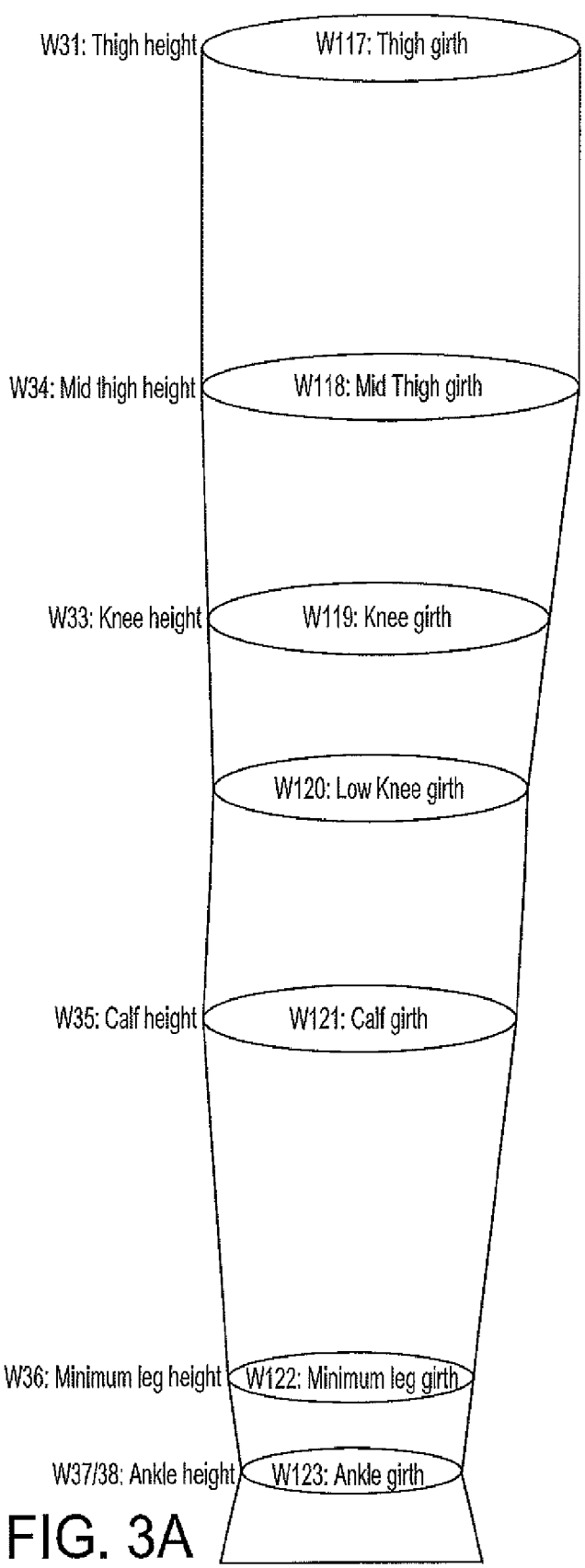
FIGS. 3A and 3B are diagrams defining the leg area from body scan data (FIG. 3A) and defining the leg area of a relaxed garment (FIG. 3B).

The method and system of this disclosure are based upon output of body scanning. Body scanners can give output in various ways. For example, in one nonlimiting embodiment, the body scanning output may comprise a height and circumference of a certain body location, e.g. waist, hip, or ankle. In this embodiment, this output is processed by calculating the area of the flat projection of the 3-dimensional part. This will typically be a trapezoid. For accuracy, the selected body part must be composed of as many sub-segments as possible. See for example FIG. 2A for the panty area and FIG. 3A for the leg area.

In another nonlimiting embodiment, the body scanning output may comprise a surface area of a pre-defined body part, e.g. panty or leg area. In this embodiment, body scanner software used in this method and system provides these areas directly and these can be used for further processing.

For purposes of the present invention, the panty area for an individual consumer can often be defined directly by the software of the body scan equipment. If this is not possible, output of height and circumference at specific body locations can be used to calculate the surface of the panty area of the scanned person. In FIG. 2A, a nonlimiting example is given where the panty is divided into 4 zones. The labels indicate the identification that is used by TC$^2$ scanners for the 5 body locations that are used.

For the leg area, the same approach can be followed as for the panty area. See for example FIG. 3A.

Figure 3B:
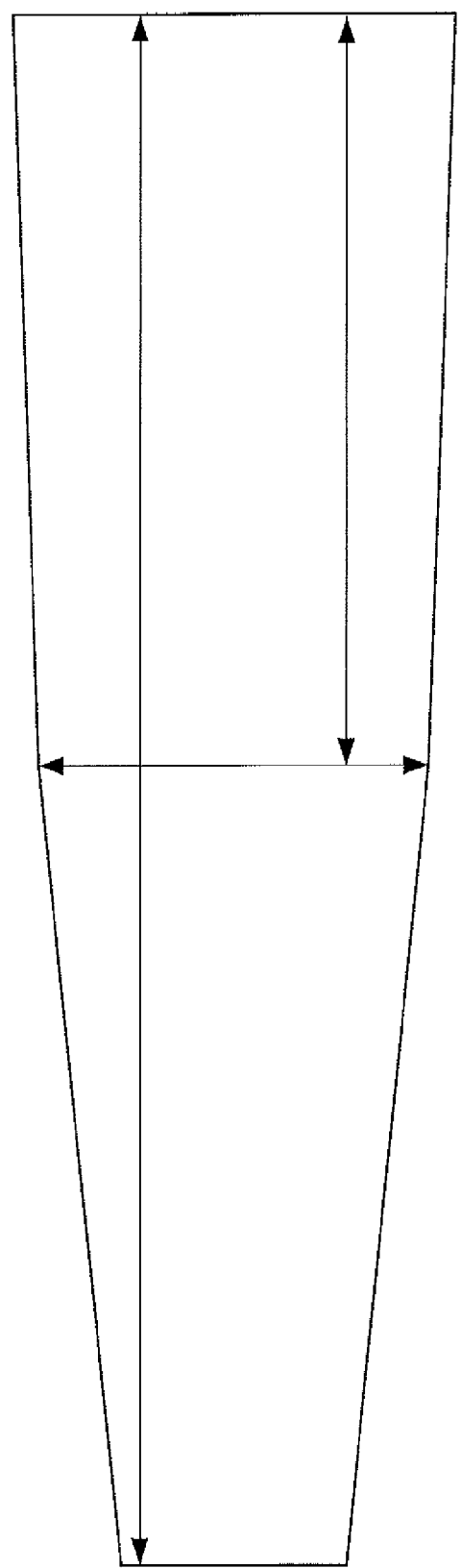

The method and system of this disclosure are further based upon the area of a relaxed garment. For the area of relaxed garments, the area of the full range of sizes needs to be defined as input for the stretch level calculation. In one nonlimiting embodiment, measurement is done by tape measurement of the garment when lying flat at multiple locations. See, for example, FIG. 2B for the panty area and FIG. 3B for the leg area. However, as will be understood by the skilled artisan upon reading this disclosure, depending on the design of the garment, the method of measurement and the locations measured can be chosen differently.

The method and system of this disclosure further comprises use of the stretch level of a garment in wear as a key metric for defining the comfort of the garment. As a non-limiting example, stretch level is defined for the panty and the leg area as follows:

$$\text{Stretch level (panty area)} = \frac{\text{surface of the panty area of the wearer}}{\text{surface of the panty area of relaxed garments}}$$

and $$\text{Stretch level (leg area)} = \frac{\text{surface of the leg area of the wearer}}{\text{surface of the leg area of relaxed garments}}$$

Stretch limits are then used to determine if the size, as given by the size chart, will provide adequate comfort and fit. At elevated stretch levels, the compression of the garment will be high and become uncomfortable. At too low stretch levels, the compression will become too low for proper fit. The stretch limits can be defined in various ways.

In one nonlimiting embodiment, existing body size data of a target population is used. In this embodiment, limits can be set based on statistical evaluation of the data on the panty and leg area of an existing body scan database, which is representative for the wearer. In this embodiment, such limits are set to a level where a certain percentage of the scanned consumers are expected to experience a too high or a too low stretch level.

In another nonlimiting embodiment, compression or other force related data available for the garment can be used to define the stretch limits.

The stretch limits are then used to make a recommendation for the optimal or right size based upon the body scan measurements for the wearer or purchaser. Then, if the stretch level, as defined by the body scan measurement of the individual consumer, is exceeding the high limit, or inferior to the low limit, the software or app that uses this method, will recommend a larger or smaller size for the wearer.

In one nonlimiting embodiment, the method and system of this disclosure are further refined through use of pressure sensors on body forms, designed from body scan data.

In one nonlimiting embodiment, the method and system of this disclosure can provide feedback for improvement in sizing recommendations to garment retailers.

In one nonlimiting embodiment, the method and system of the disclosure allows the consumer to order garments once a size is recommended.

The following section provides further illustration of the method and system for improving size selection of garments. The test protocol is illustrative only and is not intended to limit the scope of the invention in any way.

Test Protocol

A photograph is taken of an interested purchaser with a mobile device such as a tablet or mobile telephone. The photograph is then entered into a computer program which develops a scan based upon the photograph and calculates panty and leg surface from the scan. The program can further define the current size and chosen style of the wearer, based on input from the wearer and data from size charts in the software. Computer program will also include data of the surface of relaxed garments. Based upon this information, the computer program will determine if size according to the size chart is suitable, or gives a recommendation for another size. In one nonlimiting embodiment, the computer program is based on TC$^2$ scanners. In one nonlimiting embodiment, the computer program is provided as an app (application software) on the mobile device. In a preferred embodiment, the process takes about 15 seconds.

What is claimed is:

1. A method of identifying optimal undergarment sizing comprising:
   (a) obtaining a body scan based upon a photograph taken of an interested purchaser and/or wearer of the undergarment;
   (b) using the body scan to determine selected body size dimensions; and
   (c) identifying optimal undergarment size based upon the selected body size dimension and a metric for comfort, wherein the undergarment is elastic and wherein the metric for comfort is determined from:
      (i) a surface area of one or more predefined body parts; and
      (ii) an area of a relaxed undergarment; and
      (iii) a stretch level of an undergarment and limits for a minimum and maximum stretch level of a given size of a given undergarment.

2. The method of claim 1 wherein the undergarment is hosiery or pantyhose.

3. The method of claim 1 further comprising use of pressure sensors on body forms designed from body scan data to further optimize size selection.

4. The method of claim 1 further comprising providing feedback for improvement in sizing recommendations to garment retailers.

5. The method of claim 1 further comprising allowing the consumer to order undergarments once a size is recommended.

6. A system of facilitating and/or improving satisfaction with size selection of an elastic undergarment, said system comprising a body scanner which produces a body scan is based upon a photograph taken of an interested purchaser and/or wearer of the undergarment to define the area of the surface of key parts of a wearer of an undergarment and a computer program which determines comfort metrics based upon a defined area of surface for relaxed undergarments in these key parts, defined stretch levels of undergarments in these key parts, and defined limits for minimum and maximum stretch level of a given size of a given undergarment and provides a recommendation for selecting the optimal size on the basis of these comfort metrics.

7. The system of claim 6 wherein the undergarment is hosiery or pantyhose.

8. The system of claim 6 further comprising use of pressure sensors on body forms designed from body scan data to further optimize size selection.

9. The system of claim 6 further comprising providing feedback for improvement in sizing recommendations to garment retailers.

10. The system of claim 6 further comprising allowing the consumer to order undergarments once a size is recommended.

* * * * *